(12) United States Patent
Chiu

(10) Patent No.: US 7,342,681 B2
(45) Date of Patent: Mar. 11, 2008

(54) HIGH-SPEED CALIBRATION METHOD AND SYSTEM FOR AN IMAGE-CAPTURE APPARATUS

(75) Inventor: Chui-Kuei Chiu, Hsin-Chu (TW)

(73) Assignee: Transpacific IP, Ltd, Taipei (TW)

( * ) Notice: Subject to any disclaimer, the term of this patent is extended or adjusted under 35 U.S.C. 154(b) by 745 days.

(21) Appl. No.: 09/903,670

(22) Filed: Jul. 13, 2001

(65) Prior Publication Data

US 2003/0011828 A1 Jan. 16, 2003

(51) Int. Cl.
  G06F 15/00 (2006.01)
  H04N 1/46 (2006.01)
(52) U.S. Cl. .................... 358/1.9; 358/504; 702/194
(58) Field of Classification Search ............. 358/1.9, 358/504, 505, 514, 518; 382/272; 702/146, 702/194, 199; 708/445, 805; 345/673
See application file for complete search history.

(56) References Cited

U.S. PATENT DOCUMENTS

| | | | | | |
|---|---|---|---|---|---|
| 4,703,512 | A | * | 10/1987 | Saka et al. .................... | 382/199 |
| 4,835,535 | A | * | 5/1989 | Shibayama et al. ......... | 341/120 |
| 5,073,712 | A | * | 12/1991 | Hellstrom ................. | 250/252.1 |
| 5,181,081 | A | * | 1/1993 | Suhan ......................... | 356/394 |
| 5,394,250 | A | * | 2/1995 | Shono ........................ | 358/3.03 |
| 5,471,208 | A | * | 11/1995 | Sauer ......................... | 341/120 |
| 5,577,136 | A | * | 11/1996 | Tanioka et al. ............. | 382/270 |
| 5,617,401 | A | * | 4/1997 | Hurst, Jr. .................. | 369/47.52 |
| 5,642,202 | A | * | 6/1997 | Williams et al. ............ | 358/406 |
| 5,649,073 | A | * | 7/1997 | Knox et al. .................... | 358/1.9 |
| 5,649,253 | A | * | 7/1997 | Cocca ......................... | 396/392 |
| 5,656,802 | A | * | 8/1997 | Aoki .......................... | 235/454 |
| 5,754,920 | A | * | 5/1998 | Tanaka et al. ................ | 399/49 |
| 5,757,425 | A | * | 5/1998 | Barton et al. ............... | 348/241 |
| 5,760,918 | A | * | 6/1998 | Tanioka et al. ............. | 358/445 |
| 5,773,809 | A | * | 6/1998 | Watanabe et al. ...... | 235/462.27 |
| 5,777,313 | A | * | 7/1998 | Watanabe et al. ...... | 235/462.25 |
| 5,940,170 | A | * | 8/1999 | Berg et al. ................... | 356/5.1 |
| 6,005,614 | A | * | 12/1999 | Katayama .................... | 348/241 |
| 6,044,179 | A | * | 3/2000 | Savakis ...................... | 382/270 |
| 6,049,762 | A | * | 4/2000 | Ganz et al. ................. | 702/104 |
| 6,094,508 | A | * | 7/2000 | Acharya et al. ............ | 382/199 |
| 6,115,114 | A | * | 9/2000 | Berg et al. ................. | 356/5.13 |
| 6,134,029 | A | * | 10/2000 | Granger ...................... | 358/504 |
| 6,154,573 | A | * | 11/2000 | Murayama et al. ......... | 382/254 |
| 6,163,339 | A | * | 12/2000 | Meunier ................... | 348/218.1 |
| 6,163,342 | A | * | 12/2000 | Suzuki ....................... | 348/364 |
| 6,164,745 | A | * | 12/2000 | Nagoshi et al. ............... | 347/15 |
| 6,164,750 | A | * | 12/2000 | Subirada et al. .............. | 347/19 |
| 6,181,356 | B1 | * | 1/2001 | Ohnishi et al. .............. | 347/116 |
| 6,285,799 | B1 | * | 9/2001 | Dance et al. ................ | 382/261 |
| 6,330,371 | B1 | * | 12/2001 | Chen et al. ................. | 382/260 |

(Continued)

*Primary Examiner*—Madeleine AV Nguyen
(74) *Attorney, Agent, or Firm*—Stolowitz Ford Cowger LLP

(57) ABSTRACT

The present invention provides a calibration method and circuit for outputting an average calibration value used in an image-capture apparatus. The calibration circuit comprises difference means accepting a plurality of digital signals from capturing a pixel of a calibration chart. The difference means is for operating each digital signal with subtracting a base value, and whereby filters any aberrant digital signal. Divider means accepts the digital signals for operating each digital signal with dividing a number of scanned times, and whereby prevents an operation of any signal from overflowing. Direct average means accepts the digital signals for summing the digital signals and then divides the number of scanned times, and whereby speeds a calibration operation.

29 Claims, 4 Drawing Sheets

U.S. PATENT DOCUMENTS

| | | | |
|---|---|---|---|
| 6,424,751 B2 * | 7/2002 | Carney et al. | 382/272 |
| 6,441,923 B1 * | 8/2002 | Balasubramanian et al. | 358/3.23 |
| 6,459,821 B1 * | 10/2002 | Cullen | 382/294 |
| 6,474,767 B1 * | 11/2002 | Teshigawara et al. | 347/19 |
| 6,535,649 B1 * | 3/2003 | Chiu | 382/274 |
| 6,545,950 B1 * | 4/2003 | Walukas et al. | 368/47 |
| 6,606,171 B1 * | 8/2003 | Renk et al. | 358/475 |
| 6,608,941 B1 * | 8/2003 | Suzuki et al. | 382/272 |
| 6,650,442 B1 * | 11/2003 | Chiu | 358/474 |
| 6,658,164 B1 * | 12/2003 | Irving et al. | 382/274 |
| 6,683,981 B1 * | 1/2004 | Matama | 382/167 |
| 6,711,285 B2 * | 3/2004 | Noguchi | 382/162 |
| 6,768,513 B1 * | 7/2004 | Watanabe et al. | 348/246 |
| 6,794,424 B2 * | 9/2004 | Holcomb et al. | 523/137 |
| 6,822,766 B2 * | 11/2004 | Hill et al. | 358/474 |
| 6,862,098 B1 * | 3/2005 | Tanuma et al. | 356/623 |
| 6,956,674 B1 * | 10/2005 | Ishikawa | 358/3.03 |
| 6,978,215 B2 * | 12/2005 | Nikitin | 702/95 |
| 2001/0010736 A1 * | 8/2001 | Kadono | 382/243 |
| 2001/0028749 A1 * | 10/2001 | Kimura | 382/240 |
| 2001/0041018 A1 * | 11/2001 | Sonoda | 382/275 |
| 2002/0012476 A1 * | 1/2002 | Dillen et al. | 382/274 |
| 2002/0014577 A1 * | 2/2002 | Ulrich et al. | 250/205 |
| 2002/0018944 A1 * | 2/2002 | Irving et al. | 430/21 |
| 2002/0114521 A1 * | 8/2002 | Fujii et al. | 382/209 |
| 2002/0122213 A1 * | 9/2002 | Hill et al. | 358/474 |
| 2002/0180869 A1 * | 12/2002 | Callison et al. | 348/203 |
| 2003/0011828 A1 * | 1/2003 | Chiu | 358/504 |
| 2003/0016263 A1 * | 1/2003 | Takahashi et al. | 347/19 |
| 2004/0145787 A1 * | 7/2004 | Lin | 358/504 |

* cited by examiner

HIGH-SPEED CALIBRATION METHOD AND SYSTEM FOR AN IMAGE-CAPTURE APPARATUS

BACKGROUND OF THE INVENTION

1. Field of the Invention

The invention relates to a calibration method and system, and more particularly to a high-speed calibration method and system for a scanner.

2. Description of the Prior Art

A problem prevalent in image scanning or digitizing systems is the requirement for a calibration operation in order to correct for non-uniformities therein prior to use. Generally, in beam scanning systems and plural element scanning systems, such as charge-coupled devices (CCDs), the sensor(s) must be calibrated. Calibration of a sensor offset is directed to determining the level of the signal in response to reflective or non-reflective regions of the document, for example a black region in a black-and-white document. Calibration also is directed to characterizing the gain of the sensor over a range of reflectance so as to adequately adjust any amplification of the signal to maximize the dynamic range thereof.

In systems employing plural element scanning devices, such as charge-coupled devices, for viewing by raster scanning an original, the output signal produced by the CCD includes a potential attributable to the inherent operating characteristics of the CCD. To restore the image output signal of the CCD to a true or absolute value, the potential derived from the CCD, referred to as the offset potential or signal, must be removed from the image signal. However, if the offset signal that is removed is greater or less than the actual offset signal, a noticeable aberration or distortion in the image output signal may result. Since the operating characteristics of a CCD often vary widely from one CCD to another and even vary from time to time for the same CCD or for different integration rates, the accurate determination of the offset signal to be removed is often difficult. The problem is further complicated in systems where multiple CCDs are employed.

Heretofore, various apparatus and methods have been developed to address the sensor characterization problem, some of which are described in the following disclosures which may be relevant:

U.S. Pat. No. 3,586,772 to Hardin, issued Jun. 22, 1971, discloses an optical character reader which employs a clipping level determined as a function of black and white peaks detected during a normalization scan.

U.S. Pat. No. 4,555,732 to Tuhro, issued Nov. 26, 1985, is another example of a device that corrects for offset and gain drift. Tuhro discloses an image sensor correction system which maintains the offset voltages in the shift registers of a multi-channel image sensor substantially equal. U.S. Pat. No. 4,555,732 discloses that a pair of control gates permits sampling the current offset voltages in the shift register of each channel to provide an adjusted potential for balancing any differences between the shift registers. Specifically described is a device that compares the various offsets of a plurality of shift registers and determines a single offset potential to be applied to each shift register according to the comparison.

However, notwithstanding various calibration methods are applied, there are still other noticeable problems during calibration, for example, the memory and time for calibration. Especially, the more complex the calibration method is, the more the consumption of time and memory is. FIG. 1 is a flow chart illustrating the calibration method in accordance with the prior art. The image scanning system first captures calibration information from a calibration chart (step 110). The scanned calibration information is first saved in the calibration memory (step 120). Next, the calibration information is read and operated by the CPU of a host computer (step 130). When the calibration information is captured with multitude times, the reading and operation by the host computer may spend much time. When the host computer implements the calculation and operation for the calibration information, it may first transmit the normalized calibration information into the calibration memory (step 140). Accordingly, the calibration with the host computer spends much memory and operation time. Thus, the reduction of memory and time for calibration is very important for a high-speed scanner.

SUMMARY OF THE INVENTION

It is an object of the present invention to provide a calibration method for an image scanning system. A calibration chart is scanned at multitudes of times for capturing multi-time scanned video signals for the calibration method.

It is another object of the present invention to provide a calibration method and system for an image scanning system. The calibration system can accept multi-time scanned video signal and provide high-speed operation of the calibration to generate more precise calibration data for reducing the effects of aberrant factors.

It is yet an object of the present invention to provide a high-speed calibration method and system for an image scanning system. The calibration method and system reduce the consumption of memory and time for calibration process.

The present invention provides a calibration method and circuit for outputting an average calibration value used in an image-capture apparatus. The calibration circuit comprises difference means accepting a plurality of digital signals from capturing a pixel of a calibration chart. The difference means is for operating each digital signal with subtracting a base value, and whereby filters any aberrant digital signal. Divider means accepts the digital signals for operating each digital signal with dividing a number of scanned times, and whereby prevents an operation of any signal from overflowing. Direct average means accepts the digital signals for summing the digital signals and then divides the number of scanned times, and whereby speeds a calibration operation.

BRIEF DESCRIPTION OF THE DRAWINGS

A better understanding of the invention may be derived by reading the following detailed description with reference to the accompanying drawing wherein.

DESCRIPTION OF THE PREFERRED EMBODIMENT

The calibration method of the present invention is applicable to a board range of image-capture apparatus and various objective articles. While the invention is described in terms of a single preferred embodiment, those skilled in the art will recognize that many steps described below can be altered without departing from the spirit and scope of the invention.

Furthermore, shown is a representative portion of the calibration of the present invention. The drawings are not necessarily to scale for clarity of illustration and should not be interpreted in a limiting sense. Accordingly, these articles may have dimensions, including length, width and depth, when scanned in an actual apparatus.

In the present invention, a calibration system used in a scanner comprises memory means for storing at least a first digital signal from scanning a pixel of calibration chart by a first time. Difference means accepts the first digital signal and at least a second digital signal from scanning the pixel. The difference means is for operating a first summation of the first digital signal subtracting a base value and the second digital signal subtracting the base value. The difference means is also for replacing the first digital signal in the memory means by the first summation, and whereby filters any aberrant digital signal. Divider means is for getting a second summation of the first digital signal divided by a number of scanned times and the second digital signal divided by the number of scanned times. The divider means is also for replacing the first digital signal in the memory means by the second summation, and whereby prevents an operation of any signal from overflowing. Direct average means is for getting a third summation of the first digital signal and the second digital signal, and is for replacing said first digital signal in the memory means by the third summation, and whereby speeds a calibration operation.

Figure 1:
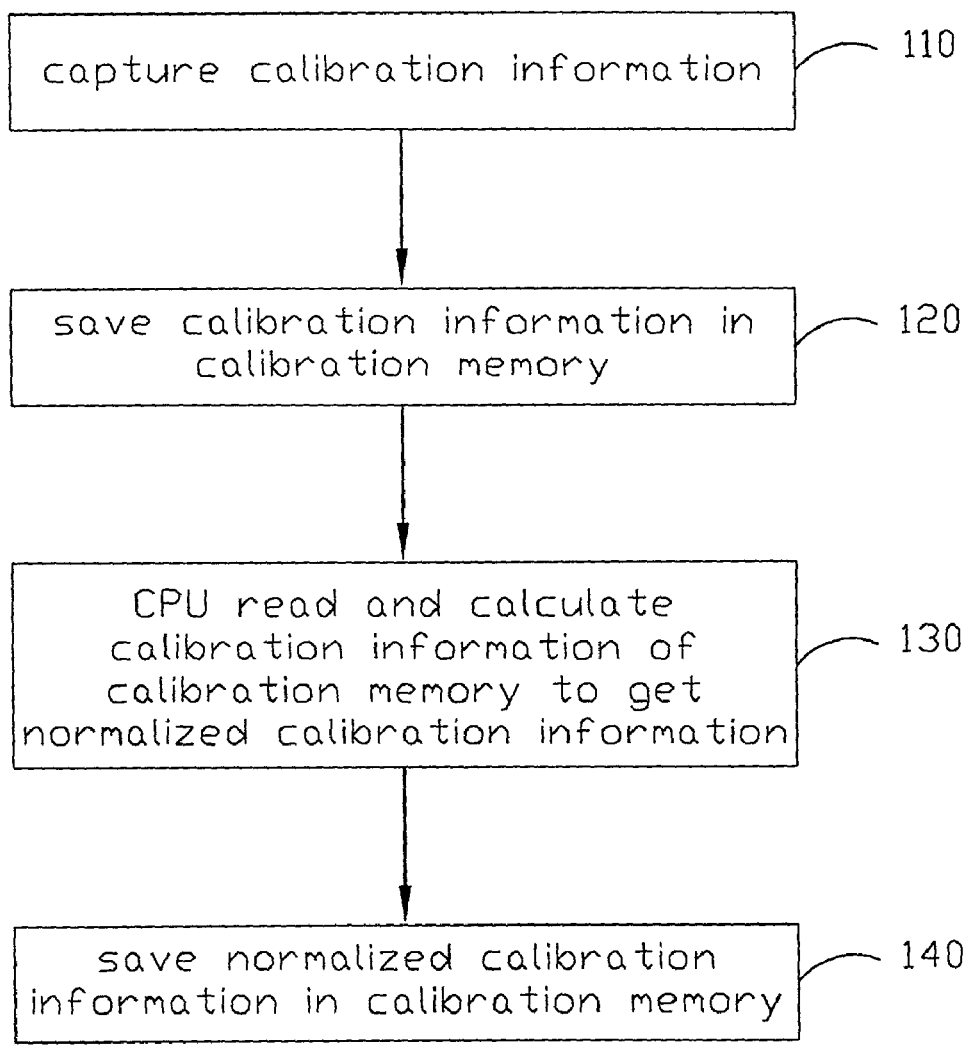
FIG. 1 is a flow chart illustrating the calibration method in accordance with the prior art.
Figure 2:
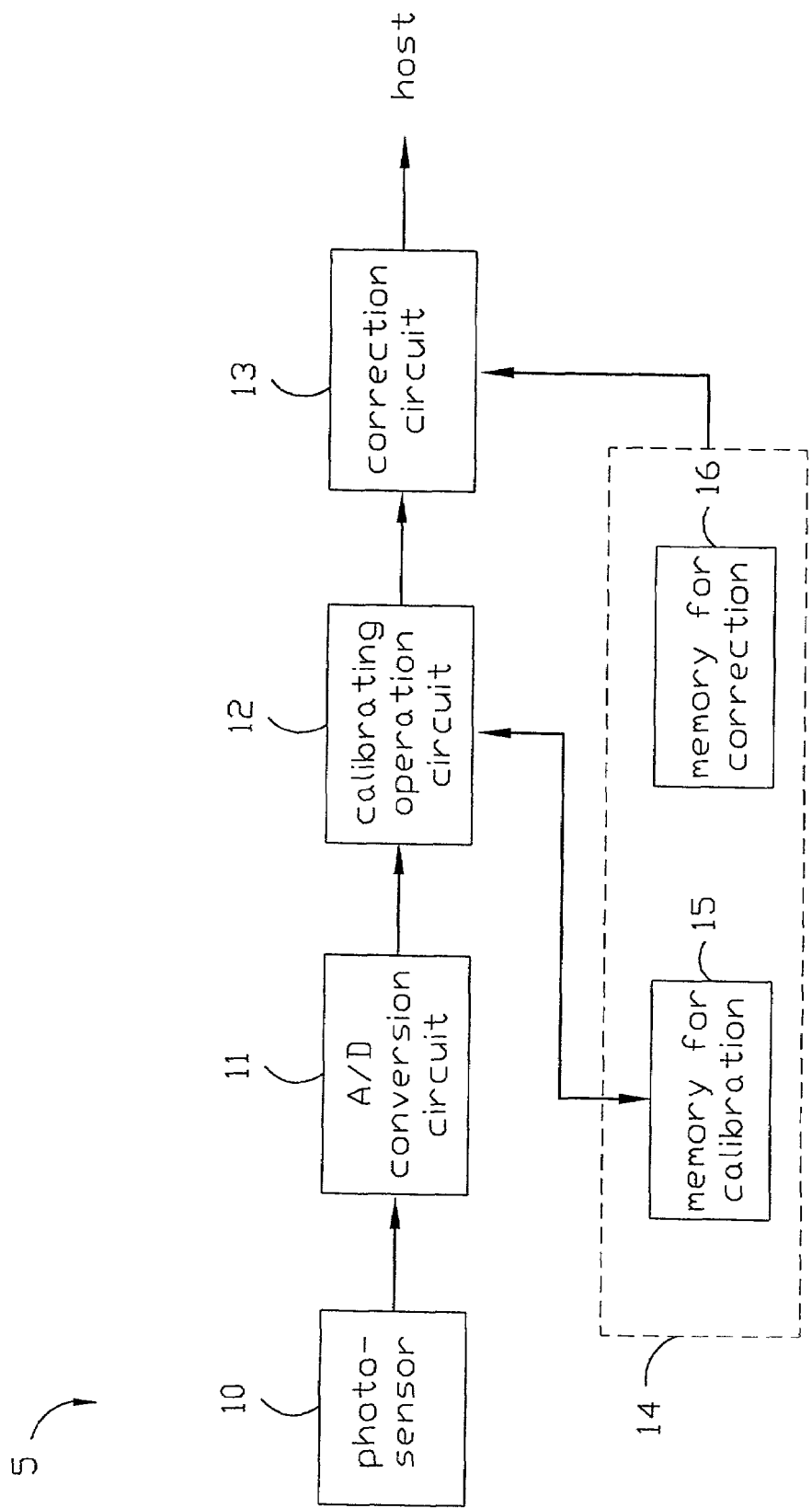
FIG. 2 illustrates a block diagram showing a main part of the color image scanning device of the present invention.

FIG. 2 illustrates a block diagram showing a main part of the color image scanning device 5 of the present invention. A reference numeral 10 designates a photo-sensor array, such as a CCD sensor array that scans a calibration chart. In the embodiment, the CCD sensor array consists of CCD elements aligned. Furthermore, the calibration chart consists of multitudes of pixels that are aligned one or more lines. The color image scanning device 5 employs the CCD sensor array to convert light reflected from the calibration chart to a plurality of electrical signals. Each CCD element may be employed to produce video signals wherein each video signal represents an associated pixel of the calibration chart as a greyscale level within a predetermined range. In the present invention, each CCD element reads the any pixel for many times to output signals of multi-time scanning for calibration.

The video signals of the general 16 bits are transmitted into a calibrating operation circuit 12 through an A/D conversion circuit 11. As a key step of the present invention, cooperating with a main memory zone 14 and only utilizing the length of 2 bytes, the calibrating operation circuit 12 provides simultaneously operating video signals of multi-time scanning with hardware circuit instead of conventional software calculation utilizing the length of 3 bytes, which speeds the calibration acquierence and operation. In the embodiment, the calibrating operation circuit 12 cooperates with a memory zone for calibration 15 in the main memory zone 14 and operates the video signals of multi-time scanning. Furthermore, the calibrating operation circuit 12 is built in any application specific integrated circuit. Of course in the main memory zone 14, there are other memory zones for other functions, such as a memory zone for correction 16. Next, the calibrating operation circuit 12 outputs averagely calibrating video signals to a subsequent correction circuit 13 for general correction process, such as shading correction. The correction circuit 13 also cooperates with the main memory zone 14

Figure 3:
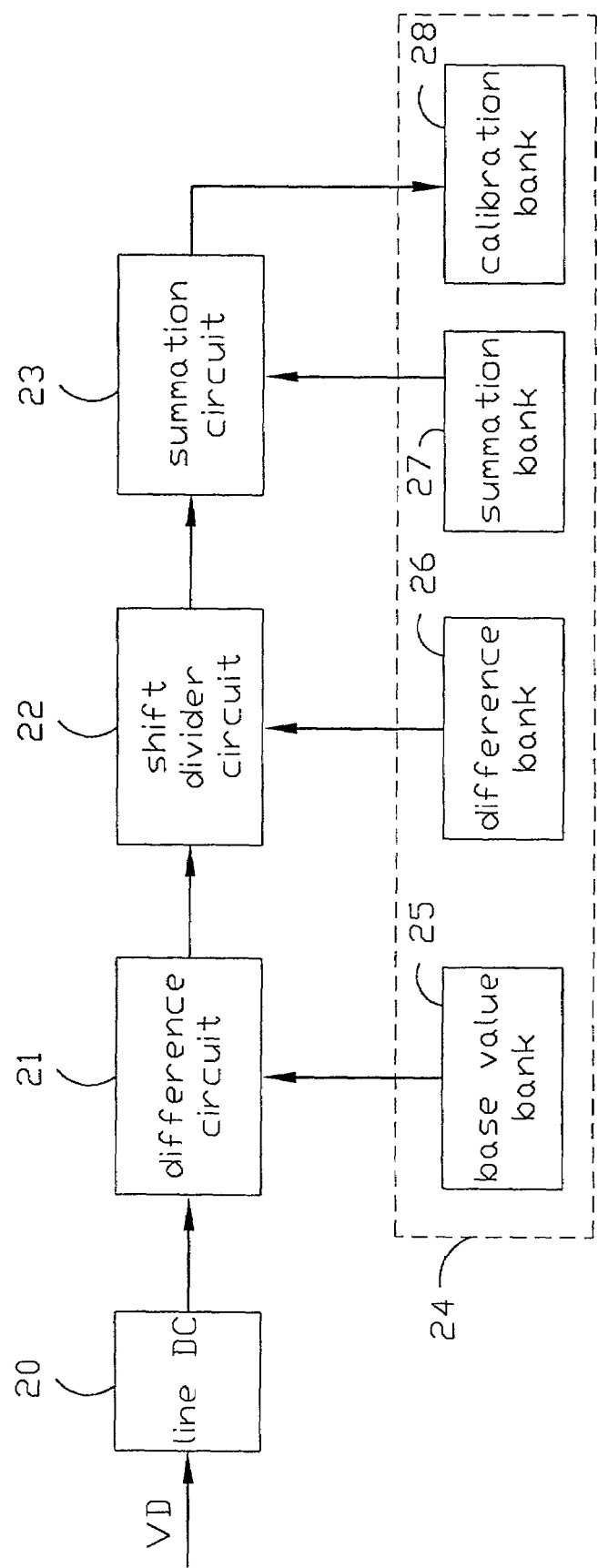
FIG. 3 is a block diagram illustrating details of the calibrating operation circuit in accordance with the present invention.

FIG. 3 is a block diagram illustrating details of the calibrating operation circuit 12 of FIG. 2 cooperating with the memory zone for calibration 15 of FIG. 2. The video signals of multi-time scanning are transmitted into a line DC circuit 20 for removing a suitable DC bias voltage. Next, the present invention provides multitudes of operation circuits for the video signals, such as a difference circuit 21, a shift divider circuit 22, and a summation circuit 23. Each operation circuit can be optional for requirement and solely operate the video signals. Through cooperating with defaulted or primary information stored in the memory zone for calibration 24, each operation circuit can fast operate the video signals of multi-time scanning to get an averaged video signal. Each operation circuit operating the video signals of multi-time scanning is explained as following.

First, the CCD sensor array has multitudes of linear sensor array that each consists of "m" amount of CCD. A pre-determined calibration chart consists of "m" amount of pixels aligned in a line. Each linear sensor array may scan the pre-determined calibration chart at "n" times or "n" time period. In the embodiment, any linear sensor array, such as a red channel, for example, $VD_R(n,m)$ represents the video data of red channel from scanning the $m_{th}$ pixel by the $m_{th}$ CCD at the $n_{th}$ time scanning. Initially, the series of video signals through A/D conversion are presented as $VD_R(1,1)$, $VD_R(1,2)$, $VD_R(1,3)$, ..., and $VD_R(1,m)$, are transmitted into the difference circuit 21. Central value (accurate medium value) or a base value (offset-operating medium value) "$BV_m$" is obtained from $VD_R(1,m)$, $VD_R(2,m)$, $VD_R(3,m)$, ..., and $VD_R(n,m)$ for the $m_{th}$ pixel, and stored in a base value bank 25. For the first pixel (or CCD), the individual difference values $(VD_R(1,1)-BV_1)$, $(VD_R(2,1)-BV_1)$, $(VD_R(3,1)-BV_1)$, ..., and $(VD_R(n,1)-BV_1)$, are stored in a calibration bank 28. Furthermore, a level-range value is set for checking the video signals to be within a reasonable bandwidth or not.

For the subsequent video signals, for example, $VD^R(2,1)$, $VD_R(2,2)$, $VD_R(2,3)$, ..., and $VD_R(2,m)$ through the line DC circuit 20, the difference circuit 21 compares $VD_R(2,1)$, $VD_R(2,2)$, $VD_R(2,3)$, ..., and $VD_R(2,m)$ with the level-range value and $BV_1$, $BV_2$, ..., and $BV_m$. For $VD_R(2,1)$, the difference circuit 21 outputs the difference value between $VD_R(2,1)$ and $BV_1$ on the condition of the difference value smaller than 2 times level-range value, or outputs the level-range value. Thus, the difference circuit 21 prevents the aberrant video signals from being operated to result in distorted values. Then the output values $(VD_R(2,1)-BV_1)$, $(VD_R(2,2)-BV_2)$, $(VD_R(2,3)-BV_3)$, ..., and $(VD_R(2m)-BV_m)$, are individually added to $(VD_R(1,1)-BV_1)$, $(VD_R(1,2)-BV_2)$, $(VD_R(1,3)-BV_3)$, ..., and $(VD_R(1,m)-BV_m)$, which replace $(VD_R(1,1)-BV_1)$, $(VD_R(1,2)-BV_2)$, $(VD_R(1,3)-BV_3)$, ..., and $(VD_R(1,m)-BV_m)$ originally stored in the calibration bank 28. Thus, for the $m_{th}$ pixel scanned with n times, a "DiffSum(m)" represents the summation of $(VD_R(1,m)-BV_m)$, $(VD_R(2,m)-BV_m)$, $(VD_R(3,m)-BV_m)$, ..., and $(VD_R(n,m)-BV_m)$ and the averagely calibrating value for the $m_{th}$ pixel is the summation of $BV_m$ and (DiffSum (m)/n). One of advantages of the difference circuit 21 can prevent the operation or values stored in the memory from overflowing or truncation.

Cooperating with a difference bank 26 in the memory of calibration 24, the shift divider circuit 22 provides the operations of the truncated average and round-value average values for the averagely calibrating values of the pixels (or CCDs). The truncated average for the $m_{th}$ pixel scanned with n times is a summation of $(VD_R(1,m)/n)$, $(VD_R(2,m)/n)$, $(VD_R(3,m)/n)$, . . . , and $(VD_R(n,m)/n)$. One the other hand, the round-value average for the $m_{th}$ pixel scanned with n times is a summation of $((VD_R(1,m)+DC)/n)$, $((VD_R(2,m)+DC)/n)$, $((VD_R(3,m)+DC)/n)$, . . . , and $((VD_R(n,m)+DC)/n)$ where DC value may be an assigned or pre-determined parameter stored in the difference bank 26. One of advantages of the truncated average or round-valued average also prevents the averagely calibrating values of the pixels (or CCDs) from overflowing during the operation. Furthermore, the other advantage of the round-valued average can be the more precise averagely calibrating values of the pixels (or CCDs).

Furthermore, cooperating with a summation bank 27, the summation circuit 23 provides the operation of the direct average for the averagely calibrating values of the pixels (or CCDs). The direct average for the $m_{th}$ pixel scanned with n times is a summation of $VD_R(1,m)$, $VD_R(2,m)$, $VD_R(3,m)$, . . . , and $VD_R(n,m)$, divided by n. Thus, the image scanning device can apply multi-time scanning on the calibration to quickly generate averagely calibrating values. Compared with conventional calibration operation with software framework, the hardware framework of the present invention only spends less than 1 second for multi-time calibration scanning, but the software framework may spends as much as 60 seconds. Furthermore, the present invention also provides an alarm function for the sake of overflowing during operation of the summation circuit 23.

Figure 4:
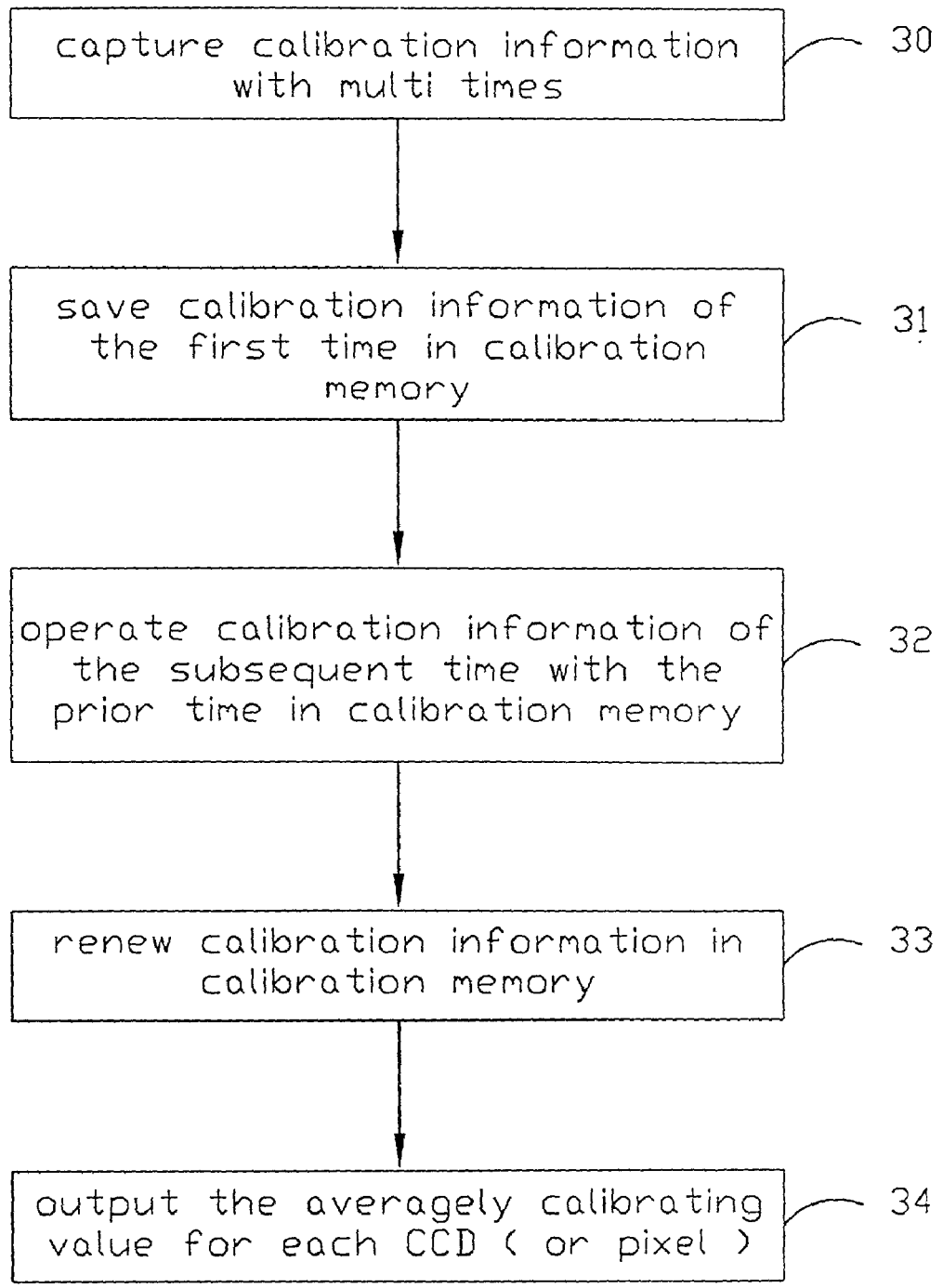
FIG. 4 is a flow chart illustrating the calibration method in accordance with the present invention.

FIG. 4 shows a flow chart illustrating the calibration method in accordance with the present invention. Users can choose any calibration chart and the CCDs of the image scanning system scan the calibration chart with multitude times for capturing the calibration information with multi times (step 30). The first-time scanned calibration information is first saved in the calibration memory as default information (step 31). Then the subsequent scanned calibration information is operated with the first-time (prior-time) scanned calibration information by the calibration system (step 32). Next, the latest operated calibration information is stored in the calibration memory to renew one originally stored therein (step 33). When the multi-time scanned calibration information is implemented through the operation by the calibration system, the calibration system outputs the averagely calibrating values of the CCDs (step 34).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
   scanning a calibration chart a first time to obtain a first digital signal;
   saving the first digital signal in a memory;
   scanning the calibration chart a second time to obtain a second digital signal;
   obtaining a first base value and a second base value from a base value bank;
   adjusting the first and second digital signal by respectively employing the first and second base value to obtain a first and a second adjusted digital signal;
   summing the first and second adjusted digital signal; and
   replacing the saved first digital signal with the summed first and second adjusted digital signal.

2. The method of claim 1, further comprising dividing a value of the summed first and second adjusted digital signal by a number of times that the calibration chart is scanned to produce an average value.

3. The method of claim 1, wherein the calibration chart comprises a plurality of pixels.

4. The method of claim 3, wherein the first and the second base values comprise pixel offset values for respective first and second pixels of the calibration chart.

5. The method of claim 1, further comprising range-checking the results of the adjusting.

6. A method, comprising:
   scanning a calibration chart a first time;
   performing a first subtraction operation to subtract a base value from a value for a first pixel from the first scan of the calibration chart;
   saving the result of the first subtraction operation in a calibration memory;
   scanning the calibration chart a second time;
   performing a second subtraction operation to subtract the base value from a value for the first pixel from the second scan of the calibration chart;
   summing the results from the first and second subtraction operations; and
   saving the results of said summing in the calibration memory, thereby replacing the result of the first subtraction operation.

7. The method of claim 6, further comprising dividing a value of the summed results by a number of times that the calibration chart is scanned to produce an average value.

8. The method of claim 6, further comprising range-checking the results of the first and second subtraction operations.

9. The method of claim 6, wherein the first and the second base value comprise pixel offset values.

10. An apparatus, comprising:
    means for scanning a calibration chart a first time to obtain a first digital signal and a second time to obtain a second digital signal;
    means for saving the first digital signal in a memory;
    means for obtaining a first base value and a second base value from a base value bank;
    means for respectively adjusting the first and second digital signal by respectively employing the first and second base value to obtain a first and a second adjusted digital signal;
    means for summing the first and second adjusted digital signal; and
    means for replacing the saved first digital signal with the summed first and second adjusted digital signal.

11. The apparatus of claim 10, further comprising means for dividing a value of the summed first and second adjusted digital signal by the number of times that the calibration chart is scanned to produce an average value.

12. The apparatus of claim 11, further comprising means for dividing a value of the summed results by the number of times that the calibration chart is scanned to produce an average value.

13. An apparatus, comprising:
means for scanning a calibration chart a first time time to obtain a first digital signal and a second time to obtain a second digital signal
means for performing a first subtraction operation to subtract a base value from a value for a first pixel from the first scan of the calibration chart and for performing a second subtraction operation to subtract the base value from a value for a first pixel from the second scan of the calibration chart;
calibration memory means for saving the result of the first subtraction operation;
means for summing the results from the first and second subtraction operations; and
means for replacing the result of the first subtraction operation in said calibration memory means with said results of said summing.

14. The apparatus of claim 13, further comprising means for range-checking the results of the first and second subtraction operations.

15. The apparatus of claim 13, further comprising means for replacing the saved result of the first subtraction operation with the summed results from the first and second subtraction operations.

16. An apparatus, comprising:
a photo-sensor for converting into electrical signals light reflected from a first and second scan of a calibration chart;
an analog-digital conversion circuit for respectively converting the electrical signals from the first and second scan into a first and a second digital signal;
a memory capable of saving the first digital signal; and
a calibration operation circuit capable of:
obtaining a first base value and a second base value from a base value bank;
respectively adjusting the first and second digital signal by respectively employing the first and second base value to obtain a first and a second adjusted digital signal;
summing the first and second adjusted digital signal; and
causing the saved first digital signal to be replaced with the summed first and second adjusted digital signal.

17. The apparatus of claim 16, wherein the calibration operation circuit comprises a divider circuit capable of dividing a value of the summed first and second adjusted digital signal by the number of times that the calibration chart is scanned to produce an average value.

18. The apparatus of claim 16, wherein the base value bank is embodied in the memory.

19. The apparatus of claim 16, wherein the calibration circuit further comprises:
a line DC circuit; and
at least one operation circuit.

20. The apparatus of claim 19, wherein the at least one operating circuit comprises at least one operating circuit selected from the group comprising: a difference circuit, a shift divider circuit, and a summation circuit.

21. The apparatus of claim 16, wherein the memory comprises a plurality of memory banks.

22. The apparatus of claim 21, wherein the plurality of memory banks comprise at least two memory banks selected from the group comprising: a base value memory bank, a difference memory bank, a summation memory bank and a calibration memory bank.

23. An apparatus, comprising:
a photo-sensor capable of scanning a calibration chart a first time and a second time;
a calibration operation circuit capable of performing a first subtraction operation to subtract a base value from a value for a first pixel from the first scan of the calibration chart and further capable of performing a second subtraction operation to subtract the base value from a value for a first pixel from the second scan of the calibration chart and further capable of summing the results from the first and second subtraction operations; and
a memory capable of storing the result of the first subtraction operation, and further capable of replacing the result of the first subtraction operation with the summed results from the first and second subtraction operations.

24. The apparatus of claim 23, further comprising a divider circuit capable of dividing a value of the summation of the results from the first and second subtraction operations by the number of times that the calibration chart is scanned to produce an average value.

25. The apparatus of claim 23, wherein the calibration operation circuit is further capable of range-checking the results of the first and second subtraction operations.

26. The apparatus of claim 23, wherein the calibration circuit further comprises:
a line DC circuit; and
at least one operation circuit.

27. The apparatus of claim 26, wherein the at least one operating circuit comprises at least one operating circuit selected from the group comprising: a difference circuit, a shift divider circuit, and a summation circuit.

28. The apparatus of claim 23, wherein the memory comprises a plurality of memory banks.

29. The apparatus of claim 28, wherein the plurality of memory banks comprise at least two memory banks selected from the group comprising: a base value memory bank, a difference memory bank, a summation memory bank and a calibration memory bank.

* * * * *

UNITED STATES PATENT AND TRADEMARK OFFICE
CERTIFICATE OF CORRECTION

PATENT NO. : 7,342,681 B2
APPLICATION NO. : 09/903670
DATED : March 11, 2008
INVENTOR(S) : Chui-Kuei Chiu It is certified that error appears in the above-identified patent and that said Letters Patent is hereby corrected as shown below:

At column 7, line 2, please delete duplicate word "time" before "to".

Signed and Sealed this

Twenty-sixth Day of October, 2010

David J. Kappos
*Director of the United States Patent and Trademark Office*